Figure 3R:
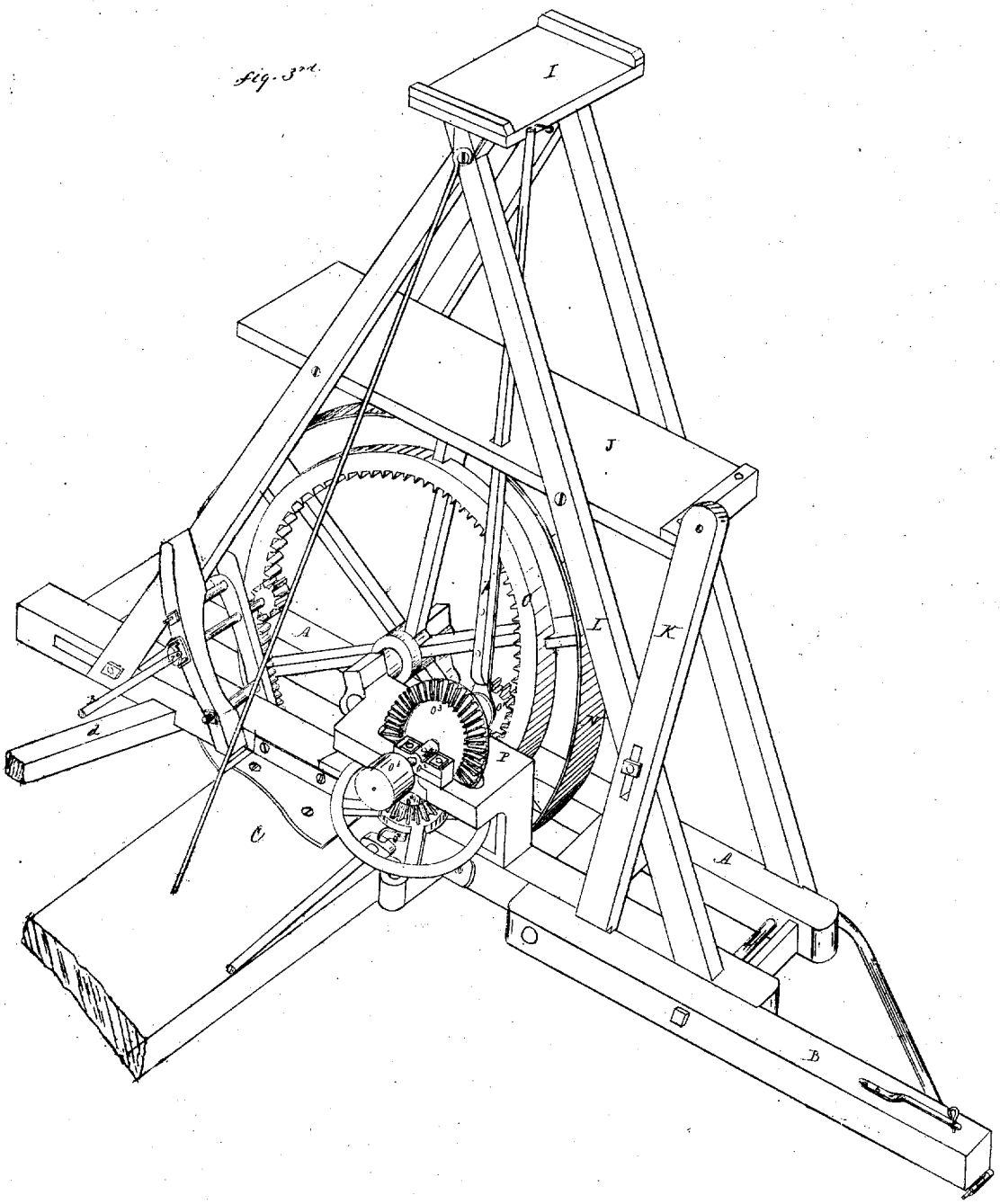

2 Sheets. Sheet 1.
W. H. Seymour.
Mower.
No. 1004. Reissued July 10. 1860.
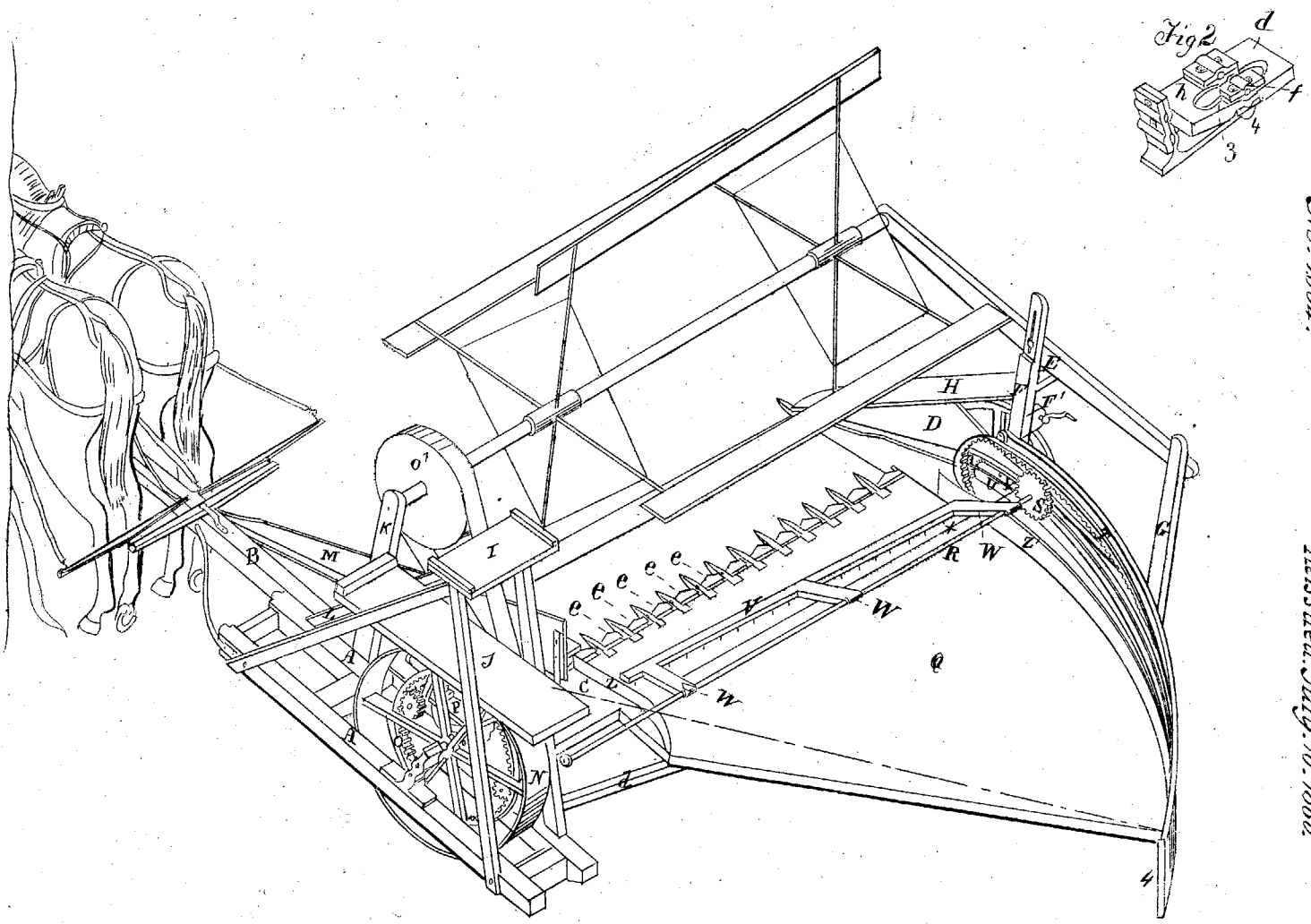
C. L. Hughes.
Augustus Fohlen } Witnesses.
William H. Seymour
By O. S. & R. Peck
his Attorney 2 Sheet. Sheet 2.

W. H. Seymour,
Mower.

No. 1004

Reissued July. 10 1860

UNITED STATES PATENT OFFICE.

WM. H. SEYMOUR, OF BROCKPORT, NEW YORK, ASSIGNOR TO HIMSELF, D. S. MORGAN, A. PALMER, AND S. G. WILLIAMS.

IMPROVEMENT IN REAPING-MACHINES.

Specification forming part of Letters Patent No. 8,212, dated July 8, 1851; Reissue No. 1,004, dated July 10, 1860.

DIVISION B.

*To all whom it may concern:*

Be it known that I, WILLIAM H. SEYMOUR, of Brockport, in the county of Monroe and State of New York, have invented new and useful Improvements on Reaping-Machines for Cutting all Kinds of Small Grain; and I do hereby declare that the following is a full and exact description of the construction and operation of the same, reference being had to the annexed drawings, making a part of this specification, in which—

Figure 1 represents a view in perspective of a reaping-machine, to which my improvements are applied, as it would appear to a spectator on the rear or stubble side thereof. Fig. 3 represents a similar view of the gearing-frame as it would appear to a spectator stationed at the point of the divider and looking toward the driving-wheel; and Fig. 2 represents an isometrical view of what I term a "combination" of boxes in one casting, in which the gearing is mostly supported.

In the operation of an automatic sweep-rake it is essential that some means should be provided for lifting the rake and holding it up while running forward, in order that it may pass over the falling grain until the end of its forward movement is reached, and for holding it firmly down upon the platform while running backward, in order that its teeth may not override the cut grain. The accomplishment of this object has, previous to the date of my invention, been attempted in various ways—such as counterbalancing the rake-head by a weight or a spring, or by holding it up by a latch until the proper moment for tripping it; but all these methods are more or less objectionable, either from the power required to operate them or from the jar to the gearing produced by the sudden change of the position of the parts.

It is one of the objects of my improvements to provide a means for raising and lowering the rake and of holding it in the attitude required which shall operate in a positive manner, and yet be free from the objections to which the means above referred to were liable; and to this end the invention claimed under this patent consists in pivoting the head of a sweep or vibrating rake upon a fulcrum or center of motion which, while capable of reciprocating freely in a rectilinear path to adapt itself to the movements of an arm, rod, or lever, which carries the rake, is yet incapable of varying its vertical distance from the platform, by which arrangement the points of the rake-teeth are held firmly down upon the platform while raking off the grain, and turned upward to the height required to pass over the falling grain when running forward without the necessity of lifting a weight, overcoming the tension of a spring, or even unfastening a latch, the vertical movements of the rake-head being produced by the rising and falling of the rake-rod itself during its circuit.

A convenient arrangement of mechanism for accomplishing the objects of my invention is shown in the accompanying drawings, which represent a harvesting-machine having an automatic rake.

The main or wheel frame A is constructed of two pieces of timber framed parallel to each other and connected by three girts, one in rear of the driving-wheel and two in front.

The tongue B, to which the team is attached, is bolted to the front end of the inner side piece of the wheel-frame.

The finger-beam or guard-piece C is attached to the inner side piece of the frame A, directly under the axle of the driving-wheel, by means of a cast-iron bracket and bolts. To the opposite end of the guard-piece C is attached the divider-piece D, which extends about three feet back of it and two and one-half feet in front of it. A brace, *d*, extends from the back end of the wheel-frame A to the back end of the divider-piece D.

The reel-bearer E is supported by the posts F and G, which extend up from the divider-piece D. The reel-bearer extends in front of the wheel-post F about three feet, and has one end of the reel shaft hung upon its front end.

The divider-board H is made fast to the front end of the divider-piece; it is also secured to the wheel-post F, about two feet above the dividing-piece.

The seat I for the operator is constructed by four braces extending up from the wheel-frame A—one from each corner of the frame—forming two triangles parallel to each other, to the top of which the seat is attached. The foot-board J is bolted to these braces.

The reel-post K, the lower end of which is inserted into a mortise in the inner side piece of the frame A, near its front end, passes up at the side of the diagonal brace L, to which it is attached by a bolt passing through a slot in it, and also through one in the brace. This post, to the upper end of which the reel-shaft is hung, is supported in this manner to admit of its being raised and lowered to vary the height of the reel.

A guard-board, M, extends from the tongue B to the guard-piece C for the purpose of bringing the grain to the sickle. A brace of three-fourths inch round iron extends from the tongue to the guard-piece directly under the guard-board.

The driving-wheel N, three feet or more in diameter, is of cast-iron, but might be made of wood, and is hung on an axle that has its bearings, of cast-iron, bolted upon the upper side of the frame A. An internal spur cog-wheel, O, is cast upon the arms of the driving-wheel.

A pinion, O′, which is hung on a transverse shaft, $O^2$, which has its bearings attached to the cast frame P, in manner hereinafter described, meshes into the spur-wheel O. A bevel-wheel, $O^3$, about one foot in diameter, is hung on this shaft and meshes into a bevel-pinion, $O^4$, hung on a vertical crank-shaft, $O^5$, that has its upper bearings in a box supported in the cast-iron frame P, and its lower bearing in a step bolted to the inner side piece of the frame A.

The combination-box or cast frame P, Fig. 2, in which the gearing is mainly hung, has a long broad base, and is bolted to the inner side piece of the frame A. Near the back end of the base is an elevation of six or eight inches, to the back part of which is bolted another piece of casting, and thus two boxes are formed, one above the other, for the inner end of the axle of the driving-wheel, which axle is shifted from one to the other of these boxes to vary the height of the cut. There is another elevation at the front end of the base corresponding in height nearly with the one at the back end, and the upper-plate part of said cast frame or combination-box extends from one of these elevations to the other, as shown at *h*, Fig. 2, and is made broader than the base or elevation, so as to project beyond them, as shown at 2, Fig. 3. Near the center of this upper plate there is a slot made in which the bevel-wheel is placed, its shaft being supported at each end by bearings on this plate. The upper crank-box, 4, is bolted to the under side of this plate directly under the bevel-wheel box *f*. By this arrangement of the gearing it is more compact than it could otherwise be made, and admits of a pitman-rod of sufficient length being used without the necessity of widening the machine to make room for the pitman-rod, which would have to be done were not the gearing thus compactly arranged.

The mechanism can be thrown into or out of gear at will by means of a disconnecting-lever, *p*, which operates a sliding clutch on the driving-shaft $O^2$. The sickle *e e e* is attached to the crank by means of a rod or pitman one and a half foot long, which gives the sickles a quick vibrating motion. The crank is two inches in length, and gives the sickle a stroke of four inches. There is a pulley, $O^6$, of four inches and a half in diameter, on the inner end of the bevel-wheel shaft, and another pulley, $O^7$, of nineteen inches in diameter, on the reel-shaft in range with it, over which pulleys runs a belt that gives motion to the reel.

The reel is made and operated in the usual manner.

The guard-teeth *o o o o*, eighteen in number, more or less, are six inches long, made of cast-iron, and attached to the guard-piece C by means of wood-screws in their front edges and on their tops. These guard-fingers have slots through them, through which the sickle vibrates, which slots are enlarged back of the sickle to prevent clogging.

The side of the machine opposite the driving-wheel is carried on a wheel two and a half feet in diameter, the axle of which slides vertically in guides secured upon the post F, in which guides it is raised and lowered by means of a rack and pinion, F′.

The platform Q, instead of being made in a square form, and extending back of the sickle, as heretofore, only three or four feet, is extended back in a circular form, as shown in the drawings, that the grain, instead of being raked off behind the machine, as heretofore, making it necessary to take up each swath as it is cut, is swept off on a circle and dropped far enough from the standing grain to be out of the way of cutting the next swath, thereby obviating the necessity for taking up each swath before another can be cut. The guards Z Z′ prevent the grain from falling off the platform or from becoming entangled in the gearing. The grain is raked from the platform of the machine by means of a rake that is made to travel back and forth in the following manner:

The rake consists of the head V, into which the teeth are inserted, the attachments W W W, the lower ends of which are firmly secured to the rake-head, the guide-rod X, passing through the attachments W W W parallel to the rake-head V and about the center of the rake, and the lever, arm, or rake-rod R, which extends horizontally across the platform and through the upper ends of the attachments W W W, so as to revolve freely therein. A pinion, *r*, of twelve cogs, (may be more or less,) is secured upon the end of the rake-rod, R which pinion meshes into the internal spur-wheel, O, and causes the rod to revolve. This rod is provided with a universal joint, $r'$, a few inches from the pinion $r$. The short section of the rod between the joint and the pinion is supported in a horizontal transverse position, with respect to the plane of the driving-wheel, by bearings secured upon the wheel-frame A, the universal joint thus forming the center of motion of the rake, as hereinafter more fully described. Another pinion, P, is secured on the rake-rod near its outer end, and is provided with cogs or some irregular surface to correspond with those of an endless rack, T, having internal teeth, in which it travels. This endless track T has parallel sides and semicircular ends, and is to be made of the shape required to produce the requisite motions of the rake, as hereinafter described. It is secured upon the outer or grain end of the platform, and is so curved that in its top view it forms the arc of a circle of which the universal joint $r'$ forms the center and the rake-rod R the radius. This rod R also extends through the pinion S and projects beyond it—say half an inch—in order that it may roll along the edge of the guide-plate U, which plate is secured in the center of the endless rack, with its edges parallel to the sides thereof, and holds the pinion S in contact with the teeth of the rack in every part of its circuit, and also acts as a support to the outer end of the rake-rod. The guide-rod X passes through one or more of the attachments W W W, and extends into the groove Y beyond the pinion S in the center of the endless rack T, as well as in that of the guide-plate U. It also projects beyond the outer end of the rake-rod R, that it may at all times continue in the groove.

The operation of the machine is as follows: Suppose the parts to occupy the position shown in Fig. 1. As the machine advances, the pinion $r$ and the rake-rod R are caused to revolve, which causes the pinion S to roll along from front to rear of the platform in contact with the teeth of the endless rack T, against which it is held by the projecting end of the rake-rod R, which rolls along the upper edge of the guide-plate U and which supports the outer end of the rake. The guide-rod X travels in the groove Y, and as it is below the level of the pinion S while the latter is in contact with the upper teeth of the rack the points of the rake-teeth are held firmly down while raking off the grain, which is swept around in the arc of a circle of which the universal joint $r'$ forms the center, and discharged heads foremost upon the ground at the side of the machine, behind the driving-wheel, and far enough removed from the standing grain to be out of the path of the team when the machine comes round in cutting the next swath. When the pinion S has arrived at the rear end of the rack T, which point is marked 4 in the drawings—that is, when the gavel has been discharged—it descends until the lower side of the rack is reached, when it begins to run forward, being held down upon the teeth of the rack by the lower side of the guide-plate U. As the pinion descends it passes below the level of the groove Y, in which the guide-rod X travels, and as this rod forms the fulcrum of the rake its teeth are correspondingly elevated and held up until the pinion S reaches the limit of its forward motion, which point is marked 3 in the drawings. When the pinion S begins to ascend the rack the guide-rod slips into a slot in the forward end of the rack, which slot forms a continuation of the groove Y, and is of a depth to permit the pinion S to rise without obstruction from the guide-rod. As the pinion rises the rake-teeth are correspondingly depressed, the guide-rod X still forming the fulcrum, and by the time the pinion has reached the upper side of the endless rack the rake-teeth are firmly pressed upon the platform. By this method of operation the rake is always supported at its outer and its inner end, thereby materially diminishing the tendency of the parts to twist or bend, and the consequent liability on the part of the gearing to become bound. Moreover, the rising and falling movements of the rake-head, being produced by the vertical movements of the rake-rod itself, are gently, yet quickly, accomplished without jar or strain on the machinery and with much greater facility than if it were necessary to lift a weight, overcome the tension of a spring, or even to unfasten a latch.

The operation of the other parts of the machine is so well known to those who are accustomed to or skilled in the art of constructing reaping-machines that any further description of them is deemed unnecessary here, especially as they form no part of the subject-matter herein claimed.

What I claim under this patent as my invention is—

The combination of the arm, rod, or lever, which carries a vibrating sweep-rake, with a guide-rod, which forms a movable fulcrum for the rake-head, substantially as described, for the purpose set forth.

WM. H. SEYMOUR.

In presence of—
CHAS. W. PALMER,
CHAS. MERIAM.